(12) United States Patent
Blazer

(10) Patent No.: US 12,517,317 B2
(45) Date of Patent: Jan. 6, 2026

(54) ACCESS FEATURE FOR CABLE JACKET HAVING LOW TENSILE STRENGTH AND HIGH ADHESION TO CABLE JACKET

(71) Applicant: CORNING RESEARCH & DEVELOPMENT CORPORATION, Corning, NY (US)

(72) Inventor: Bradley Jerome Blazer, Granite Falls, NC (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 238 days.

(21) Appl. No.: 18/130,034

(22) Filed: Apr. 3, 2023

(65) Prior Publication Data

US 2023/0236375 A1    Jul. 27, 2023

Related U.S. Application Data

(63) Continuation of application No. PCT/US2021/052270, filed on Sep. 28, 2021.
(Continued)

(51) Int. Cl.
G02B 6/44         (2006.01)

(52) U.S. Cl.
CPC ......... *G02B 6/4432* (2013.01); *G02B 6/4413* (2013.01); *G02B 6/4431* (2023.05); *G02B 6/4434* (2013.01)

(58) Field of Classification Search
CPC .................................................. G02B 6/4431
See application file for complete search history.

(56) References Cited

U.S. PATENT DOCUMENTS

2009/0180744 A1    7/2009  Bringuier et al.
2013/0108226 A1*   5/2013  Gimblet ................ G02B 6/443
                                                385/100
(Continued)

FOREIGN PATENT DOCUMENTS

WO   WO-2015014386 A1 *  2/2015  .......... G02B 6/4427
WO      2022/076191 A1    4/2022

OTHER PUBLICATIONS

Extended European Search Report, EP application No. 21878230.8, dated Oct. 16, 2024, 10 pages, European Patent Office.
(Continued)

*Primary Examiner* — Charlie Y Peng
(74) *Attorney, Agent, or Firm* — Thomas R. Irwin

(57) ABSTRACT

Embodiments of the disclosure relate to an optical fiber cable. The optical fiber cable includes a cable jacket having an interior surface and an exterior surface. The interior surface defines a central bore extending along a longitudinal axis of the optical fiber cable, and the exterior surface defines an outermost surface of the optical fiber cable. The optical fiber cable also includes a cable core including at least one optical fiber disposed within the central bore of the cable jacket. The cable jacket includes at least one access feature made of a first polymeric material disposed between the interior surface and the exterior surface. The first polymeric material has a first tensile strength ($TS_1$). Each of the at least one access feature is surrounded by a second polymeric material of the cable jacket. The second polymeric material has a second tensile strength ($TS_2$). $TS_1 \leq (\frac{2}{3}) * TS_2$.

5 Claims, 4 Drawing Sheets

Related U.S. Application Data

(60) Provisional application No. 63/087,966, filed on Oct. 6, 2020.

(56) References Cited

U.S. PATENT DOCUMENTS

| | | | |
|---|---|---|---|
| 2015/0043874 A1 | 2/2015 | Sandate et al. | |
| 2015/0104570 A1 | 4/2015 | Blazer et al. | |
| 2015/0110451 A1* | 4/2015 | Blazer | G02B 6/441 |
| | | | 385/103 |
| 2016/0041354 A1* | 2/2016 | Guenter | G02B 6/4431 |
| | | | 385/86 |
| 2018/0329168 A1* | 11/2018 | Abernathy | G02B 6/443 |
| 2020/0142144 A1* | 5/2020 | Blazer | G02B 6/4432 |
| 2020/0183112 A1* | 6/2020 | Sutehall | G02B 6/4434 |

OTHER PUBLICATIONS

International Search Report and Written Opinion of the International Searching Authority; PCT/US2021/052270; dated Dec. 27, 2021; 10 pages; US Patent Office.

Australian Patent Application No. 2021358865, Office Action dated Jan. 14, 2025, 3 pages, Australian Patent Office.

\* cited by examiner

ACCESS FEATURE FOR CABLE JACKET HAVING LOW TENSILE STRENGTH AND HIGH ADHESION TO CABLE JACKET

CROSS-REFERENCE TO RELATED APPLICATIONS

This application is a continuation of International Application No. PCT/US2021/052270 filed Sep. 28, 2021, which claims the benefit of priority of U.S. Provisional Application Ser. No. 63/087,966 filed on Oct. 6, 2020, the content of which is relied upon and incorporated herein by reference in its entirety.

BACKGROUND

The disclosure relates generally to optical fiber cables, and specifically to optical fiber cables having a cable jacket including access features embedded therein. Optical fibers are used to transmit data optically between various points in a network. Such optical fibers may be arranged in cables originating at data hubs, and the cables may include branches that drop at various locations to deliver data to nodes in the network. A variety of cable designs exist that provide such branching within a transmission network. In order to provide branches to an optical fiber cable, it is often necessary to provide access to the cable core to allow for splicing of branching units to subunits of the optical fiber cable.

SUMMARY

According to an aspect, embodiments of the disclosure relate to an optical fiber cable. The optical fiber cable includes a cable jacket having an interior surface and an exterior surface. The interior surface defines a central bore extending along a longitudinal axis of the optical fiber cable, and the exterior surface defines an outermost surface of the optical fiber cable. The optical fiber cable also includes a cable core including at least one optical fiber disposed within the central bore of the cable jacket. The cable jacket includes at least one access feature made of a first polymeric material disposed between the interior surface and the exterior surface. The first polymeric material has a first tensile strength ($TS_1$). Each of the at least one access feature is surrounded by a second polymeric material of the cable jacket. The second polymeric material has a second tensile strength ($TS_2$). In embodiments, $TS_1 \leq (2/3)*TS_2$.

According to another aspect, embodiments of the disclosure relate to an optical fiber cable. The optical fiber cable includes a cable jacket having an interior surface and an exterior surface. The interior surface defines a central bore extending along a longitudinal axis of the optical fiber cable, and the exterior surface defines an outermost surface of the optical fiber cable. The optical fiber cable also includes a cable core having at least one optical fiber disposed within the central bore of the cable jacket. The cable jacket includes at least one access feature made of a first polymeric material disposed between the interior surface and the exterior surface. Each of the at least one access feature is surrounded by a second polymeric material of the cable jacket. An adhesive bonding strength between the first polymeric material and the second polymeric material is stronger than a cohesive bonding strength within the first polymeric material so that a longitudinal tear made to access the cable will propagate through the at least one access feature.

According to a further aspect, embodiments of the disclosure relate to a method of opening an optical fiber cable. In the method, a force is applied to a first section of a cable jacket to separate it from a second section of the cable jacket. A first access feature and a second access feature are embedded in the cable jacket. The first access feature and the second access feature are made of a first polymeric material, and the cable jacket is made of a second polymeric material. The first section of the cable jacket is disposed between the first access feature and the second access feature. The first access feature and the second access feature are split such that a first portion of the first access feature remains on the first section of the cable jacket and a second portion of the first access feature remains on the second section of the cable jacket and such that a third portion of the second access feature remains on the first section of the cable jacket and a fourth portion of the second access feature remains on the second section of the cable jacket.

Additional features and advantages will be set forth in the detailed description that follows, and, in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and the operation of the various embodiments. In the drawings.

DETAILED DESCRIPTION

Referring generally to the figures, various embodiments of an optical fiber cable having a cable jacket with a fast access feature are provided. The cable jacket is made of a first polymeric material and includes one or more strips of a second polymeric material embedded therein. The strips of the second polymeric material are access features that are configured to split as a result of cohesive bonding failure of the second polymeric material. That is, the adhesive bonding strength between the first polymeric material of the cable jacket and the second polymeric material of the access feature is stronger than the cohesive bonding strength within the second polymeric material of the access feature. The greater adhesion between the access feature and cable jacket is advantageous for newer cable designs that seek to maximize free space such that the cable jacket more loosely fits around the cable core. In such designs, the access feature of certain conventional cables tends to separate from the cable jacket, weakening or creating undesired breaks in the cable jacket, especially when exposed to impacts in extreme cold conditions. As disclosed herein, the polymeric material of the access features embedded in the cable jacket are compatible with and of lower strength than the polymeric material of the cable jacket, which provides good adhesion between the access feature and the cable jacket and good impact performance in cold conditions. Exemplary embodiments of the optical fiber cable including such access features embedded in the cable jacket will be described in greater detail below, and these exemplary embodiments are provided by way of illustration, and not by way of limitation.

Figure 1:
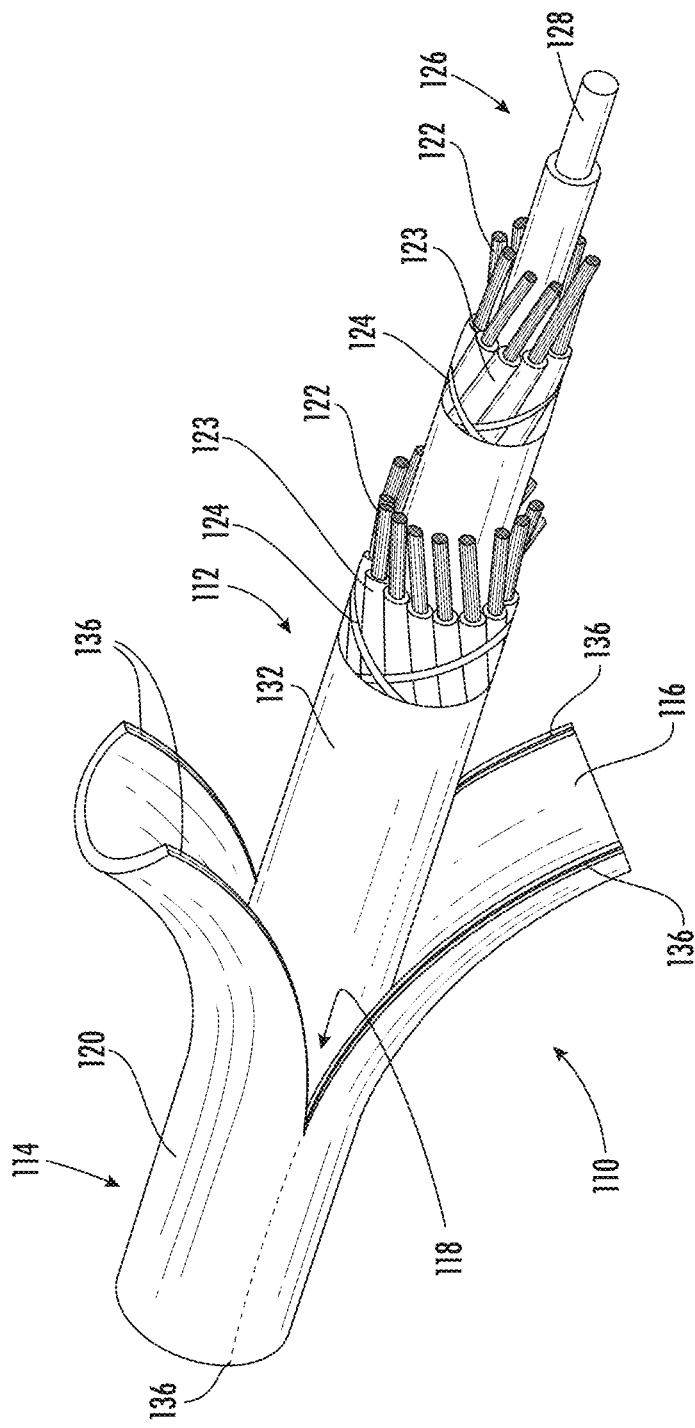
FIG. 1 depicts an optical fiber cable having a cable jacket with embedded access features that allow the cable jacket to peel apart, according to an exemplary embodiment.

Referring to FIG. 1 an optical fiber cable 110 includes a cable core 112 surrounded by a jacket 114. The jacket 114 has an interior surface 116 defining a central bore 118 and an exterior surface 120 that is the outermost surface of the optical fiber cable 110. In the embodiment depicted in FIG. 1, the cable core 112 includes a plurality of optical fibers 122 organized into a plurality of buffer tubes 123. The buffer tubes 123 are bundled together by binders 124. Further, in the embodiment depicted, the cable core 112 includes a central member 126. The buffer tubes 123 are stranded about the central member 126. In some embodiments, the central member 126 is a central strength member, which includes a glass-reinforced plastic rod 128 (or alternatively, stranded steel, aramid fibers, or other strength components), and in other embodiments, the central member 126 is a foam rod configured to provide free space for movement of the buffer tubes 123 within the core 112. In embodiments having a foam road central member 126, one or more strength members (such as glass-reinforced plastic rods 128 or flat steel wires) may instead be embedded in the jacket 114.

In some embodiments, the optical fiber cable 110 includes multiple layers of stranded buffer tubes 123, which contain the optical fibers 122. According to an exemplary embodiment, the outermost layer of the cable core 112 of the fiber optic cable includes a water-swellable tape 132. The cable core 112 depicted in FIG. 1 is provided as an example only. In other embodiments, the cable 110 may not include a central strength member, and the optical fibers may be arranged in ribbons or tight-buffered arrangements, or other configurations, which may or may not include buffer tubes 123. In still other embodiments, the cable may include copper or aluminum conductors in place of or in combination with optical fibers 122.

Still referring to FIG. 1, the jacket 114 includes an access feature 136 that facilitates access to the cable core 112. In the exemplary embodiment of FIG. 1, the access features 136 are two strips of polymeric material extruded within the polymeric material of the cable jacket 114. In embodiments, the access features 136 extend along the length of the cable 110. In other embodiments, the access features 136 are located only in regions where access to the cable core 112 is desired. As shown in FIG. 1, the main portion of the jacket 114 defines an essentially annular hoop in cross section (i.e., the jacket 114 defines a tube) surrounding the core 112, with the access features 136 extending longitudinally through the jacket 114 along a selected length of the cable 110. According to the present disclosure, the access features 136 provide tear lines that allow the jacket 114 to be separated as shown in FIG. 1. In particular, the cable jacket 114 tears because of cohesive failure of the polymeric material of the access features 136. In this way, the tear propagates through each access feature 136, splitting the access features 136 such that a portion of each access feature 136 remains on each section of the cable jacket 114 (i.e., on the top and bottom halves of the cable jacket 114 as shown in FIG. 1). In certain conventional cables, the cable jacket tore because of adhesive bonding failure between the polymeric material of the access feature and the polymeric material of the cable jacket.

Figure 2:
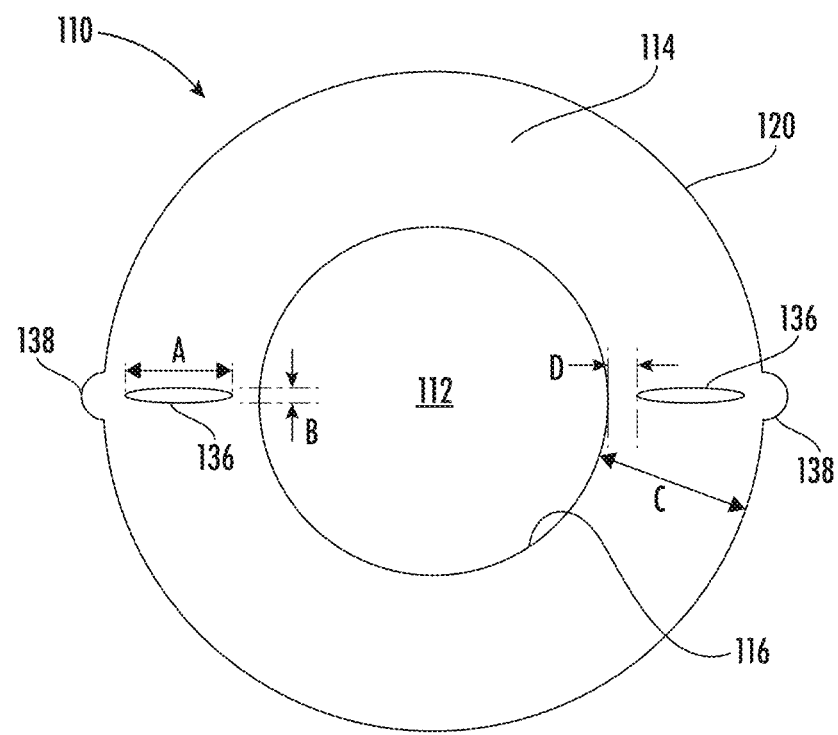
FIG. 2 depicts a schematic cross-section of an optical fiber cable depicting access features embedded in the cable jacket, according to another exemplary embodiment.

Referring now to FIG. 2, a cross-section of the jacket 114, on a plane orthogonal to the length of the cable 110, includes the access features 136 disposed within the jacket 114 (e.g., integrated with the rest of the jacket 114 via co-extrusion). In the embodiment depicted in FIG. 2, the access features 136 are wholly embedded in the jacket 114. However, in other embodiments, one or both lateral edges of the access features 136 may extend to either the interior surface 116 or exterior surface 120 of the cable jacket 114.

In embodiments, the cable jacket 114 is formed from a first polymeric material that is co-extruded with a second polymeric material of the access features 136. In this way, the polymeric materials of the cable jacket 114 and of the access features 136 cool and solidify together, creating an adhesive bond at the interface between the cable jacket 114 and the access features 136. The structure of the cable jacket 114 with embedded access features 136 thus formed encloses the cable core 112 and protects the cable core 112 mechanically and from intrusion of water, debris, and other undesired access. Notwithstanding, the access features 136 also provide relative ease of access to the cable core 112 when desired for, e.g., splicing or other purposes.

According to certain embodiments, the cable jacket 114 also includes tactile locator features, such as raised surfaces 138 or "bumps" or depressed surfaces, such as "divots," among other possibilities, that provide a tactile indication of the location of the underlying access features 136 within the cable jacket 114. In embodiments, two tactile locator features may be provided with an access feature 136 located therebetween. In embodiments, a visual indicator, such as a stripe, is also or alternatively extruded or printed over the location of the access features 136 so that locations of the access features 136 are apparent from the cable exterior. Tactile or visual locators may extend along the entire length of the cable 110, or along selected lengths.

With reference to FIGS. 1 and 2, two access features 136 are formed in the respective jacket 114 to facilitate opening of the jacket 114. Depending on the form that the core 112 takes, the number, spacing, shape, composition, and other aspects of the access features 136 may be varied. For example, in certain embodiments, a single access feature 136 in the jacket 114 may be sufficient to allow the cable jacket 114 to be peeled away from the core 112. In the embodiments depicted, the cable 110 includes two access features 136 that are equidistantly spaced around the circumference of the cable jacket 114. However, in other embodiments where multiple access features 136 are provided, the access features 136 are spaced apart from each other by a radial distance of one-tenth to one-half the circumference of the cable jacket 114. As an example, two access features 136 may be provided and spaced apart from each other by 3 mm to 10 mm so that the cable jacket 114 can be opened by tearing a strip of cable jacket 114 material out between the two access features 136. Additionally, in embodiments, the access features 136 are positioned relative to another element contained within the cable jacket 114. For example, in embodiments in which the cable jacket 114 includes a strength element, the access features 136 may be positioned radially within 30° to 60° of the strength element.

Referring to FIG. 2, the cross-sectional area of the access feature 136 has a maximum width A and a maximum thickness B. The cable jacket 114 has an average thickness C, and each access feature 136 is spaced a distance D from the interior surface 116 of the cable jacket 114. In embodiments, the access feature is equidistantly spaced between the interior surface 116 and the exterior surface 120 of the cable jacket 114 so that the distance D between a lateral edge of the access feature 136 and the interior surface 116 of the cable jacket 14 is the same as the distance between the opposite lateral edge of the access feature 136 and the exterior surface 120 of the cable jacket 114. However and especially if a tactile indicator, such as a bump 138 or a divot, is present, the distance between lateral edges of the access feature 136 and the respective interior or exterior surfaces 116, 120 of the cable jacket 114 may not be the same.

In embodiments, the maximum width A is from 0.1 mm to 4 mm. Further, in embodiments, the maximum thickness B is from 0.05 mm to 3 mm. A relatively thinner access feature 136 can improve twist performance by better transmitting shear stress across the access feature 136, which as discussed below may have a lower modulus than the polymeric material of the cable jacket 114. Further, the average thickness C of the cable jacket 114 is from 0.5 mm to 4 mm or 8% to 20% of the outer diameter of the cable jacket 114 defined by the exterior surface 120. In embodiments, the maximum width A is configured to be a percentage of the average thickness C of cable jacket 114. In such embodiments, the maximum width A represents 20% to 100% of the average thickness C of the cable jacket 114. Further, in embodiments, the lateral edge of the access feature is spaced apart from the interior surface 116 of the cable jacket 114 by a distance D of 0.1 mm to 1 mm.

In embodiments, the dimensions of the access feature 136 and cable jacket 114 may be tailored to provide a desired peel force for opening the cable jacket 114. Additionally, while the access features 136 are depicted as elliptical in shape, the access features 136 in other embodiments may be round, diamond-shaped, square, T-shaped, or otherwise shaped. In balancing the ease of access offered by the access feature 136 and the robustness of the optical fiber cable 110, the access features 136 are, in embodiments, designed close to the minimum dimensions and deviation from the properties of the polymeric material of the cable jacket 114 that still effectively guide the longitudinal separation of the jacket with reasonable effort by the user.

In embodiments, the materials and processes used to form the jacket 114, including the access features 136, may be selected so that the cohesive bonding strength of the access features 136 allows for relatively easy access to the core 112 by tearing through the jacket 114 and access features 136 as shown in FIG. 1. Nevertheless, the cable 110 may be constructed to meet other requirements for robustness, such as requirements for the jacket 114 to stay intact under tensile loads, twisting, in temperature variations, and when subjected to other known cable test criteria, such as, for example, ICEA 460, and GR20.

The cable jacket 114 and access features 136 described herein may be made from various polymeric materials. In general, the polymeric material of the cable jacket 114 has a higher tensile strength than the polymeric material of the access feature 136. In certain conventional designs, the material of the access features was selected to provide a tensile strength that was substantially equal to the tensile strength of the material of the cable jacket, relying on incompatibility between the materials to provide an adhesive tear path between the access features and cable jacket. However, according to embodiments disclosed herein, the polymeric material of the access feature 136 has a tensile strength that is about two-thirds or less of the tensile strength of the polymeric material of the cable jacket 114. According to other embodiments, the polymeric material of the access feature 136 has a tensile strength that is at least 5 MPa less than the tensile strength of the polymeric material of the cable jacket 114. For example, in embodiments, the tensile strength of the polymeric material of the access feature 136 is 10 MPa or less, and the tensile strength of the polymeric material of the cable jacket 114 is 15 MPa or more.

In this regard, the polymeric materials of the cable jacket 114 and the access features 136 may be made of the same or different predominant polymer material. In an example embodiment, the cable jacket 114 and the access feature 136 may be made of the same base polymer to provide a relatively high adhesive bond strength between the cable jacket 114 and the access feature 136. However, the polymeric material of the access feature 136 may include a higher filler ratio to decrease its tensile strength, thereby decreasing the cohesive bond strength of the access feature 136 in relation to the cable jacket 114. Further, in embodiments, the polymeric material of the access feature 136 is different from the polymeric material of the cable jacket 114 but is selected to have a lower tensile strength than and to be compatible with the polymeric material of the cable jacket 114.

In embodiments, the polymeric material of the cable jacket 114 includes, for example, at least one of medium density polyethylene (MDPE), high density polyethylene (HDPE), bimodal HDPE, linear low density polyethylene (LLDPE), flame retardant polyethylene (FRPE), cross-linked polyethylene (PEX), polypropylene (PP), polyvinylchloride (PVC), chlorinated PVC (CPVC), polyurethane (PU), thermoplastic elastomer (TPE), styrene-butadiene rubber (SBR), among others. In embodiments, the polymeric material of the access feature 136 includes at least one of low density polyethylene (LDPE), thermoplastic elastomers (TPE), olefin block copolymers (OBC), SBR, or a filled, foamed, or weakened variation of any of the foregoing polymers or of the polymers listed above for the cable jacket 114 or other similarly compatible material. In order to foam or weaken the polymer material, a device may be inserted into an extrusion head for the cable jacket 114 that uses a discharge of energy to create the access feature 136 by weakening and/or foaming the polymer melt in a desired location or in desired locations. Further, in an embodiment, the polymeric material of the access feature 136 comprises a blend of polymers, such as a blend of a polyolefin and a thermoplastic elastomer. In such embodiments, the polyolefin comprises 50 wt % to 90 wt % of the polymeric material of the access feature 136, and the thermoplastic elastomer comprises 10 wt % to 50 wt % of the polymeric material of the access feature 136.

The polymeric materials for the cable jacket 114 and access features 136 may include any of a variety of additives, such as fillers, flame retardants, processing aids, or colorants, among others. As mentioned above, the polymeric material of the access features 136 in embodiments is highly filled with such fillers as clay, chalk, talc, or the like, in order to affect the mechanical properties of the access feature 136. In embodiments, the polymeric material of the access feature 136 comprises 5 vol % to 70 vol % of fillers. Advantageously, fillers can be used in the polymer material in order to decrease the tensile strength while keeping the elastic modulus the same or increasing it.

As mentioned above, the access feature 136 is designed to undergo cohesive bonding failure in order for the cable jacket 114 to split apart. Cohesive bonding failure is characterized by tearing of the polymeric material of the access feature 136 in contrast to an adhesive bonding failure, which is characterized by a separation of the polymeric material of the access feature 136 from the polymeric material of the cable jacket 114. In embodiments, a cable jacket 114 that has undergone cohesive bonding failure of the access feature 136 will have the polymeric material of the access feature 136 on each surface of the separated cable jacket 114 (e.g. as show in FIG. 1). In contrast, a cable jacket that has undergone adhesive bonding failure will have the access feature separated from one or both sides of the separated cable jacket.

Figure 3:
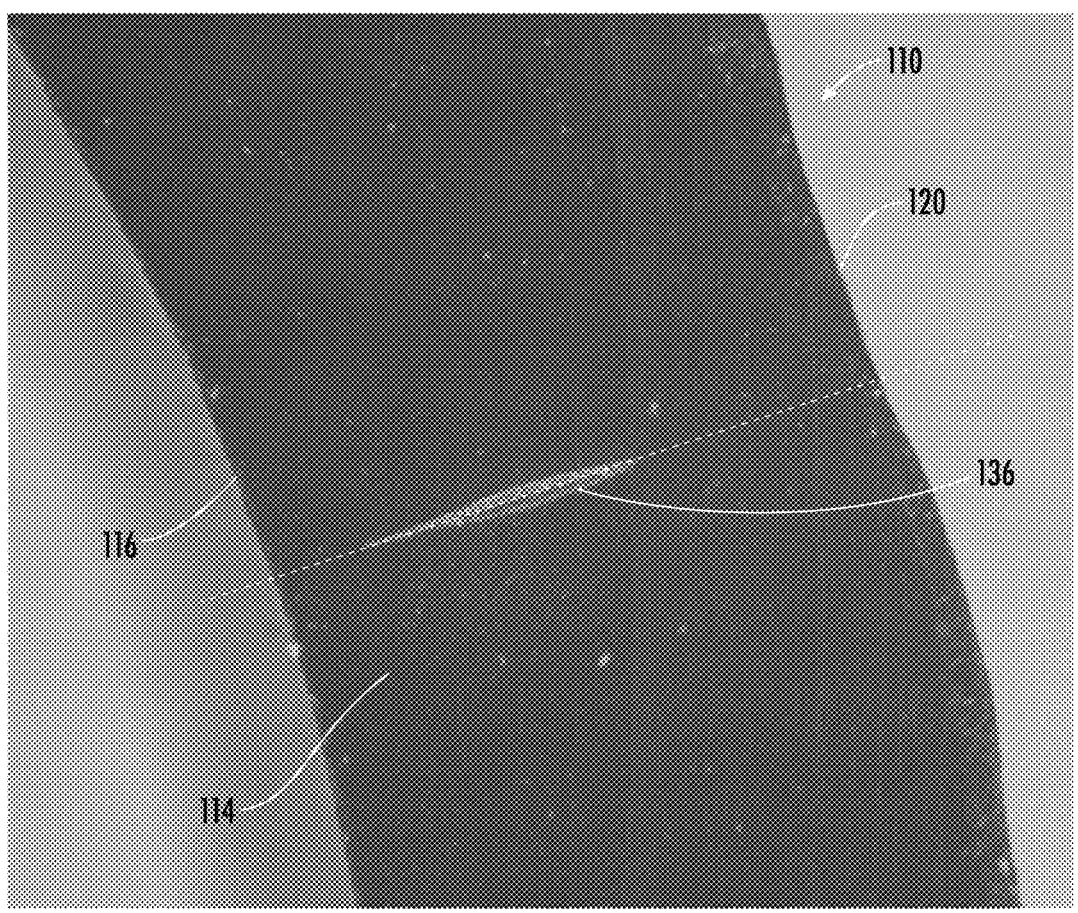
FIG. 3 is a photograph of an example construction of a cable jacket having an access feature, according to an exemplary embodiment.

Table 1, below, discloses example materials for constructing the cable jacket 114 and access features 136 along with their properties. Each combination considers a cable jacket 114 made from medium density polyethylene (MDPE), in particular AXELERON™ FO 6548 BK (available from The Dow Chemical Company, Midland, MI). In a comparative example, the polymeric material of the access feature was impact-modified polypropylene (Impact PP), in particular N05U-00 Polypropylene Impact Copolymer (available from Ineos Olefins & Polymers, USA, League City, TX). In a first example according to the present disclosure, the polymeric material of the access feature was an olefin block copolymer (OBC), in particular INFUSE™ 9807 (available from The Dow Chemical Company, Midland, MI). The first example is depicted in FIG. 3, which shows the access feature 136 embedded between the interior surface 116 and exterior surface 120 of the cable jacket 114, thereby defining tear line (dashed line) across the cable jacket 114. In a second example according to the present disclosure the polymeric material of the access feature was a 70/30 blend by weight of linear low density polyethylene, in particular AGILITY™ 1021 (available from The Dow Chemical Company, Midland, MI), and an OBC, in particular INFUSE™ 9807.

TABLE 1

Example Cable Jacket and Access Feature Polymeric Materials and Properties

|  | Jacket Material MDPE | Comparative Example Impact PP | Example 1 OBC | Example 2 70% LDPE/ 30% OBC |
|---|---|---|---|---|
| Tensile Strength (MPa) | 26.9 | 26.9 | 1.21 | 15.5 |
| Elongation at Break (%) | 800 | 132 | 1200 | Not tested |
| Elastic Modulus (MPa) | 350 | 550 | 1.30 | 118 |

The comparative example exhibits adhesive bonding failure when the cable jacket is peeled apart. As can be seen from Table 1, the polymeric material of the access feature has the same tensile strength as the polymeric material of the cable jacket. Further, the polymeric material of the access feature has a higher modulus and lower elongation than the respective modulus and elongation of the jacket material. The polymeric material of the access feature was selected to be substantially incompatible with the polymeric material of the cable jacket to promote adhesive bonding failure. Thus, the bond between the materials of the jacket and the access feature will fail before either material fails. Moreover, the bond that forms between the access feature and the cable jacket is highly process dependent. In particular, the adhesive bond strength is dependent on, e.g., the temperature during extrusion, cooling profile after extrusion, and the crush force in the pullout capstan. Small variations in these parameters can lead to a weaker than intended adhesive bond between the cable jacket and access features. In certain circumstances, no bond is formed between the cable jacket and access feature, or a bond is formed that is easily broken during typical cable handling. Thus, a cleavage plane may already exist between the access feature and the cable jacket, promoting peeling of the cable jacket apart based on overcoming the adhesive bonding strength between the access features and cable jacket.

For Examples 1 and 2, the polymeric material of the access feature 136 has a lower tensile strength than the polymeric material of the cable jacket 114. The polymeric material of the access features 136 also has a lower modulus and greater elongation than the polymeric material of the cable jacket 114. Further, the polymeric materials of the access feature 136 were selected to be compatible with the polymeric material of the cable jacket 114. In particular, the OBC included polyethylene blocks, and the blend included LDPE. Both the OBC and LDPE are compatible with the cable jacket 114 made of MDPE, thereby promoting adhesion between the access features 136 and cable jacket 114. The lower tensile strength of the polymeric material of the access features 136, in particular, tends to cause the cohesive failure of the access features 136 as opposed to adhesive bonding failure between the polymeric materials of the access feature 136 and the cable jacket 114. Advantageously, the adhesive bond created between the compatible materials of Examples 1 and 2 is less process dependent than the bond created between the incompatible materials of the comparative example. As such, small variations in processing conditions, such as processing temperature, cooling profile, and crush forces, do not have as strong of an effect on the bond formed between the access feature 136 and cable jacket 114.

As mentioned above, the comparative example includes an access feature having a higher modulus and lower elongation than the cable jacket. Thus, the access feature is harder and more brittle than the cable jacket. As a result, during cold impact testing according to ICEA 696, Section 7.23, FOTP-25, the access feature is subject to damage, especially in cable designs with increased free space and a looser cable jacket fit. In contrast, the access feature according to the present disclosure has lower modulus than the cable jacket, and the elongation to break may be comparable (e.g., within 10%) or greater than the elongation to break of the cable jacket. As such, when subjected to cold impact testing according to ICEA 696, Section 7.23, FOTP-25, the access feature will not fail unless the cable jacket fails first. Further, the elongation of the access feature 136 during jacket deformation is inversely proportional to the thickness B (as shown in FIG. 2) of the access feature 136, and thus, the elongation can be tailored by adjusting the dimensions of the access feature 136 to make the cable 110 tougher.

The performance in the cold impact test is particularly notable for newer cable designs in which the jacket 114 is more loosely fit around the cable core 112 and in which the cable core 112 may be less rigid and provided with more free space. These designs allow for shifting of the optical fibers 122 or buffer tubes 123 in response to bends in the optical fiber cable 110. However, the increased flexibility of the optical fiber cable 110 in this regard puts more stress on the interface between the access feature 136 and the cable jacket 114. In the comparative example, the adhesive bonding strength between the access feature and cable jacket is low, and the adhesive bond between the access feature and cable jacket may be broken through normal processing and handling. Thus, when subjected to cold impact testing, the stress is substantially carried by the adjoining regions of the cable jacket outside of the access feature, which is the thinnest part of the cable jacket. In contrast, the access feature 136 according to the present disclosure has a strong bond with the cable jacket 114 so that the stresses during cold impact testing are carried across the thickness of the cable jacket 114. For example, the cable jacket 114 having an access feature 136 according to the present disclosure is able to pass cold impact testing according to ICEA 696, Section 7.23, FOTP-25 where 0.5 mm or more of unsupported free space is provided between the cable jacket 114 and the cable core 112.

The access features 136 are configured to provide ease of access to the cable core 112 through the cable jacket 114 of the optical fiber cable 110. In particular, the access features 136 may be configured so that a user can peel the cable jacket 114 apart using only manual power without requiring any additional tools. For an optical fiber cable including sections of cable jacket 114 interrupted by access features, the ease of access provided by the access feature 136 can be defined, for example, by the force required to pull, or peel, one section of the cable jacket 114 from the other section of the cable jacket 114 where such separation occurs at the access features 136. The peel force can be measured as a direct force measurement, in Newtons, of the force a person must exert as a section of the cable jacket 114 is peeled away from the core 112. Such peel force must overcome the cohesive bonding strength of the access feature 136 as well as the cohesive bonding strength of any polymeric material of the cable jacket 114 adjoining the lateral edges of the access feature 136. Further, to the extent that the cable jacket 114 is adhered to the cable core 112, e.g., by water-blocking tapes, the peel force must also overcome this adhesive bonding strength in order to separate the sections of cable jacket 114.

The peel force described herein is an average peel force required to separate sections of cable jacket over a particular distance. It is also understood that peel force referenced herein is measured without any additional modifications to the cable jacket 114 exterior, such as by scoring. In embodiments, the peel force is from 30 N to 200 N. In embodiments, the method of measuring peel force includes a force testing machine, such as those available from Instron®, pulling a section of the cable jacket 114 away from the remainder of the cable 110 at angle of 90-degrees to the remainder of the cable 110.

Figure 4:
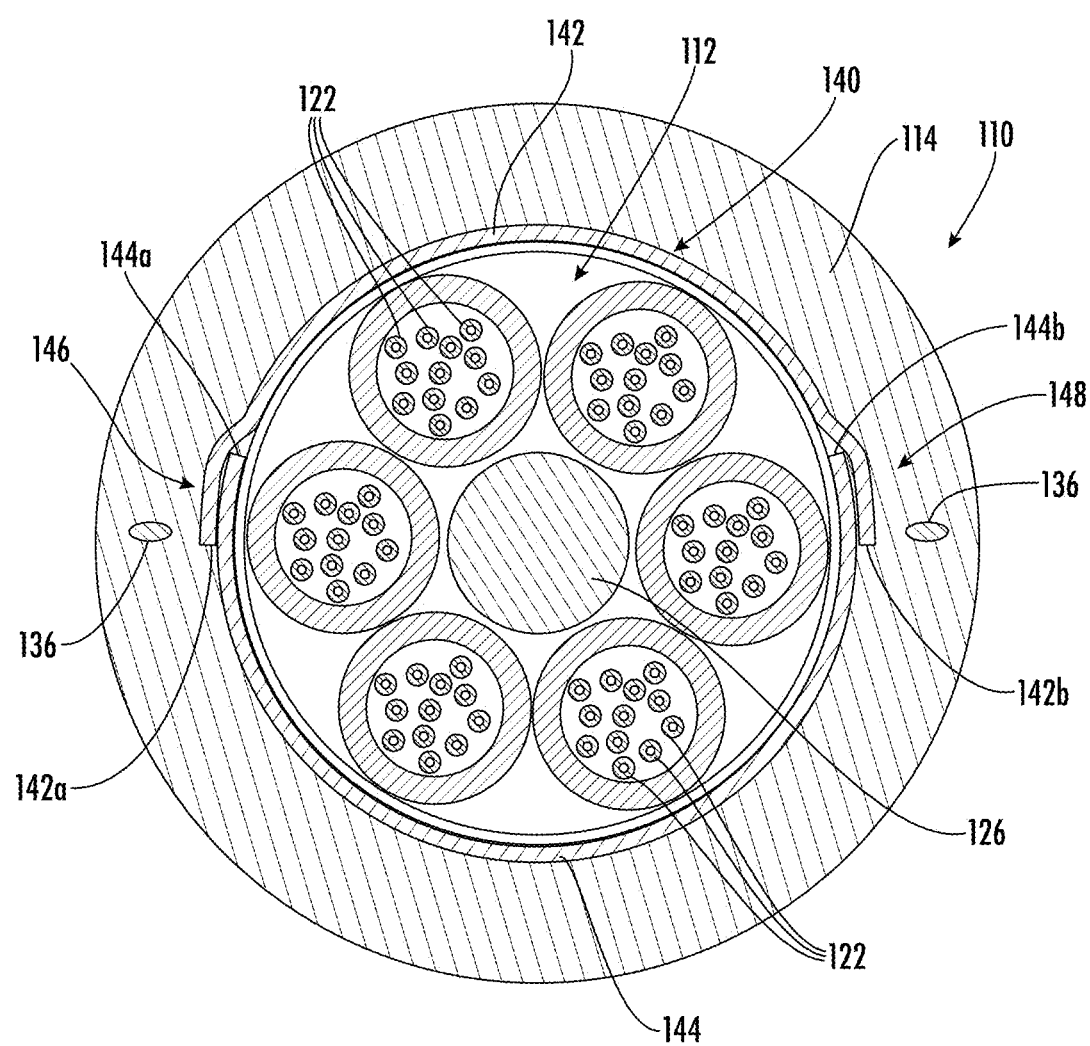
FIG. 4 depicts a cross-section of an armored optical fiber cable configured to peel apart using access features embedded in the cable jacket, according to an exemplary embodiment.

Referring now to FIG. 4, an embodiment of an armored optical fiber cable 110 is provided. In general, the armored optical fiber cable 110 is substantially similar to the optical fiber cable depicted in FIG. 1, but in the embodiment of FIG. 4, the optical fiber cable 110 further includes an armor layer 140. The armor layer 140 includes a first armor piece 142 and a second armor piece 144. The first armor piece 142 has a first end 142a and a second end 142b, and the second armor piece 144 has as first end 144a and a second end 144b. The first end 142a of the first armor piece 142 overlaps with the first end 144a of the second armor piece 144 at a first overlap region 146. The second end 142b of the first armor piece 142 overlaps with the second end 144b of the second armor piece 144 at a second overlap region 148. In this way, a complete armor layer 140 is formed around the cable core 112. While FIG. 4 shows the first armor piece 142 overlapping the second armor piece 144 in both overlap regions 146, 148, in other embodiments, the second armor piece 144 overlaps the first armor piece 142 in at least one of the overlap regions 146, 148.

As shown in FIG. 4, the first overlap region 146 is located at a first radial position, and the second overlap region 148 is located at a second radial position. In embodiments, a first access feature 136 is located within 60° of the radial position of the first overlap region 146, and a second access feature 136 is located within 60° of the radial position of the second overlap region 148. In this way, when the cable jacket 114 is peeled apart, the first armor piece 142 and the second armor piece 144 can be separated so that the armor layer 140 can also be peeled apart at the same time.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber cable, comprising:
   a cable jacket comprising an interior surface and an exterior surface, the interior surface defining a central bore extending along a longitudinal axis of the optical fiber cable and the exterior surface defining an outermost surface of the optical fiber cable; and
   a cable core comprising at least one optical fiber disposed within the central bore of the cable jacket;
   wherein 0.5 mm or more of unsupported free space is provided between the cable jacket and the cable core and wherein the optical fiber cable is configured to withstand cold impact testing according to ICEA 696, Section 7.23, FOTP-25;
   wherein the cable jacket comprises at least one access feature comprising a first polymeric material disposed between the interior surface and the exterior surface;
   wherein each of the at least one access feature is surrounded by a second polymeric material of the cable jacket; and
   wherein an adhesive bonding strength between the first polymeric material and the second polymeric material is stronger than a cohesive bonding strength within the first polymeric material so that a longitudinal tear made to access the optical fiber cable will propagate through the at least one access feature.

2. The optical fiber cable of claim 1, wherein the first polymeric material comprises a first tensile strength, wherein the second polymeric material comprises a second tensile strength, and wherein the first tensile strength is at least 5 MPa less than the second tensile strength.

3. The optical fiber cable of claim 1, wherein the first polymeric material and the second polymeric material comprise a same polymer and wherein the first polymeric material comprises a higher weight percentage of filler.

4. The optical fiber cable of claim 3, wherein the first polymeric material comprises a first elastic modulus and the second polymeric material comprises a second elastic modulus and wherein the first elastic modulus is equal to or greater than the second elastic modulus.

5. The optical fiber cable of claim 1, wherein the first polymeric material comprises a first elongation at break and the second polymeric material comprises a second elongation at break and wherein the first elongation at break is equal to or greater than the second elongation at break.

* * * * *